May 30, 1967 R. D. REED 3,323,087
SWITCH FOR DETECTING MAGNETIC MEMBERS
Filed April 18, 1966 2 Sheets-Sheet 1
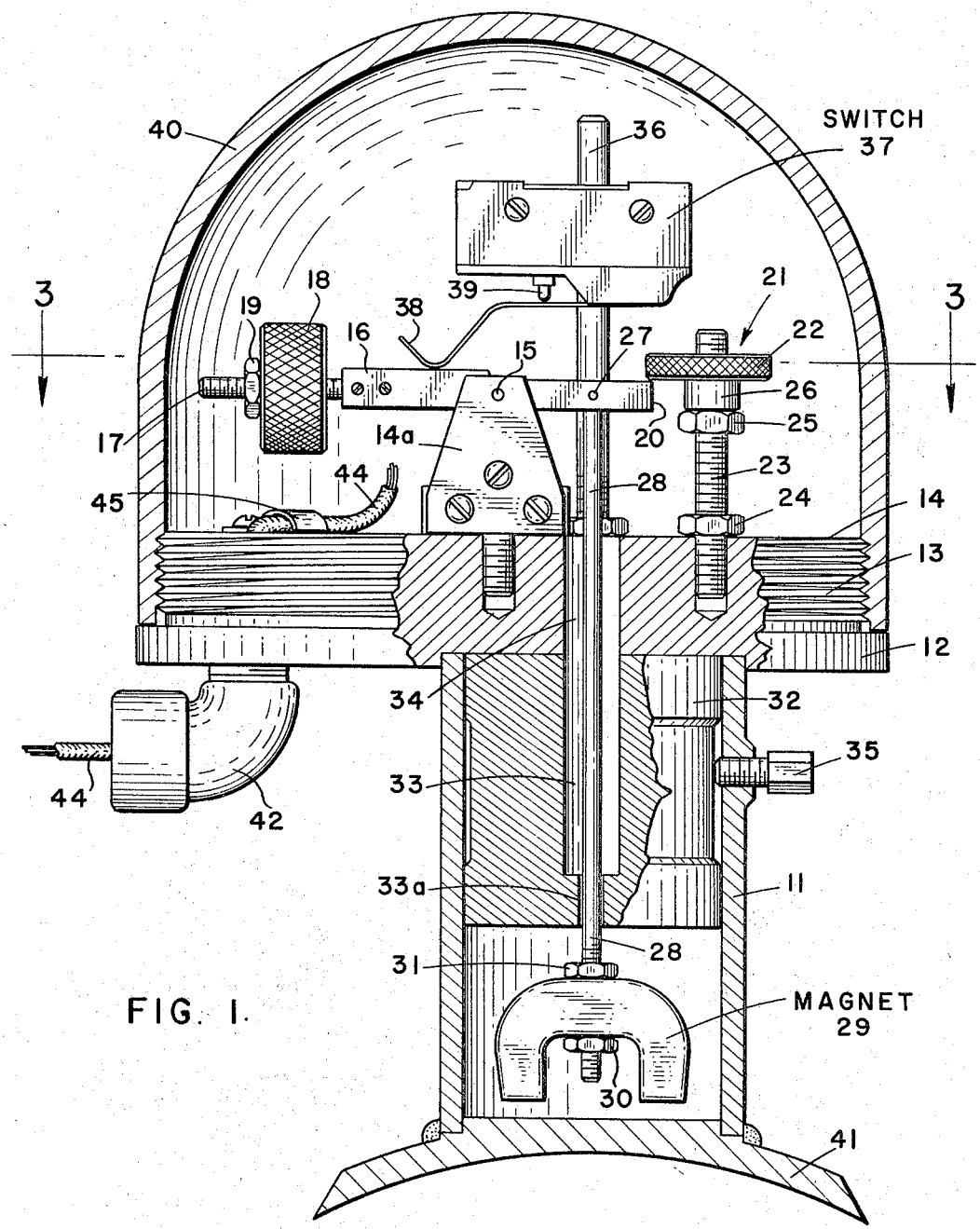
FIG. 1.
INVENTOR.
ROY D. REED,
BY
ATTORNEY.

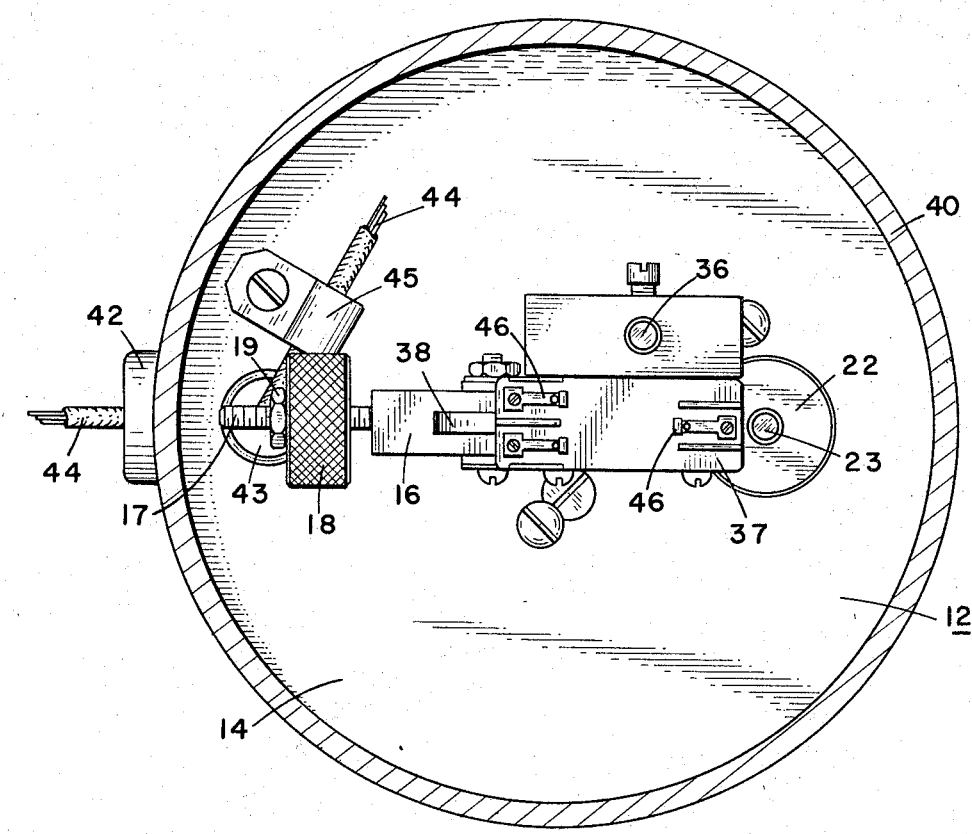
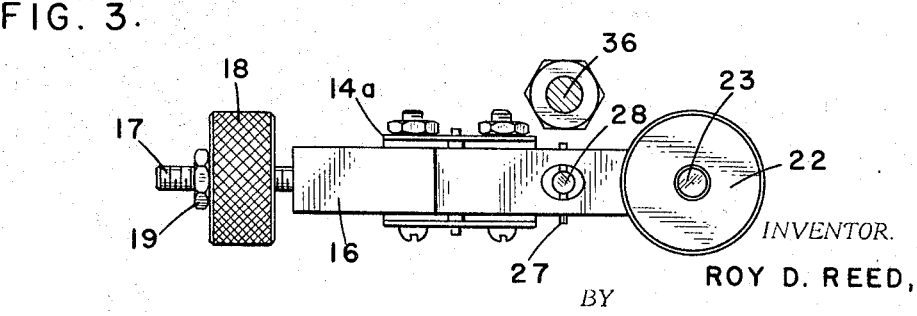

United States Patent Office 3,323,087
Patented May 30, 1967

3,323,087
SWITCH FOR DETECTING MAGNETIC MEMBERS
Roy D. Reed, Corpus Christi, Tex., assignor to Esso Research and Engineering Company
Filed Apr. 18, 1966, Ser. No. 543,382
5 Claims. (Cl. 335—205)

ABSTRACT OF THE DISCLOSURE

A detector switch employs a magnet pivotally attached to one end of an adjustable counterbalanced pivoted arm having a micro-switch operatively connected to the arm, such that passage of a metallic member in proximity to the magnet, causes corresponding movement of the magnet and movement of the arm to actuate the micro-switch, the arm being provided with an adjustable stop means to limit relative movement of the arm caused by movement of the magnet.

---

The present invention is directed to a detector switch. More particularly, the invention is concerned with a detector switch which is actuated by a magnetic member. In its more specific aspects, the invention is concerned with a detector switch suitable for use in pipeline operations.

The present invention may be briefly described as involving a detector switch comprising a counterbalanced pivoted arm provided with an adjustable stop means, the arm being counterbalanced by a longitudinally movable weight means; a micro-switch is supportingly arranged in operative relationship to the pivoted arm and is operatively connected to the pivoted arm by spring means for actuating the micro-switch.

Passage of a magnetic metallic member in proximity to said magnet, which is separated from the metallic member by non-magnetic means, causes movement of said magnet from a first position to a second position and resultant relative movement of said arm to actuate said micro-switch.

The detector switch is suitable for use with a device for "Proving Meters" such as described and claimed in the Pfrehm patent, U.S. 3,021,703, issued Feb. 20, 1962. In the present invention, moving parts of the detector switch are all outside the calibration pipe of the Pfrehm patent supra and, therefore, the present invention is particularly suitable and useful since there are no obstructions to travel of the plug means of the Pfrehm patent supra. Moreover, the detector switch of the present invention is useful where it is desirable to minimize pressure drop across the plug means in such calibration pipes as in the Pfrehm patent supra.

The present invention will be further described and illustrated by reference to the drawing in which:

FIG. 1 is an elevational view in partial section of the detector switch;

FIG. 2 is a plan view looking down on the apparatus of FIG. 1; and

FIG. 3 is a fragmentary sectional view taken along the line 3—3 of FIG. 1.

Referring now to the drawing in which a best mode and embodiment are described, numeral 11 designates a housing attached to a plate member 12 having a threaded portion 13. The surface 14 of plate member 12 is provided with a bracket 14a which pivotally supports through pivot pin 15 a pivoted arm 16 which is provided with threaded means 17 on which is threadedly arranged a longitudinally adjustable weight means 18 which serves as a counterbalance for arm 16. By manipulating threaded nut 19, the weight 18 may be longitudinally adjusted from one position to another. Arm 16 is provided with a free end 20, the upward movement of which is restrained by stop means 21 comprised of threaded circular plate means 22 threadedly arranged on threaded member 23 which, in turn, is threadedly connected to plate 12. Hex nut 24 maintains threaded member 23 in place. Hex nut 25 and spacing member 26 are provided for adjustment vertically of circular plate means 22.

Dependently and pivotally connected to arm 16 by pivot pin means 27 is rod means 28 having a permanent magnet 29 arranged thereon between threaded hex nuts 30 and 31. Magnet 29 may also be threadedly connected to rod means 28. Housing 11 is provided with a shaft guide means 32 having a passageway 33 through which the rod means 28 moves vertically responsive to movement of magnet 29. It is to be noted that the passageway 33 has a portion 33a of diminished diameter and that passageway 33 communicates with a passageway 34 in plate 12. The shaft guide means 32 is suitably held in housing 11 by holding means 35 which may be a set screw or a plurality of set screws. Other holding means may be used such as, but not limited to, supporting means and the like within the housing 11.

Supportingly arranged on post means 36 is a micro-switch 37. Depending from micro-switch 37 is a spring means 38 which contacts the top of arm 16. A spring-biased rod means 39 or other contact means protrudes from micro-switch 37 and rests against spring means 38 such that downward movement of magnet 29 causes upward pivoting of arm 16 against spring means 38 and spring-biased rod means 39, causing micro-switch 37 to be actuated.

To protect the exposed moving parts of the detector switch from the elements or from damage, an internally threaded cap means 40 is provided for threaded engagement with threaded portion 13 of plate member 12.

The housing 11 is fixedly attached such as by welding to a non-magnetic means 41, which may be a stainless steel circular beveled plate. Nonmagnetic means 41 may suitably be welded or otherwise attached into the calibrating pipe of a device such as described and claimed in the Pfrehm patent supra.

The plate member 12 is provided with an L member 42 which is threadedly connected to an opening 43 in plate member 12. Member 42 serves to lead electrical connections 44 to surface 14 where the connections 43 are held by clamp means 45 and carried to terminal posts 46 on micro-switch 37.

When the detector switch of the present invention is used to detect a plug means such as in the Pfrehm patent supra, the non-magnetic means forms part of the calibration pipe. As the plug means moves under the magnet 29, the magnet 29 moves downwardly causing the counterbalanced arm 16 to move upwardly moving spring means 38 and biasing spring-biased rod means 39 upwardly to actuate the micro-switch 37 which, in turn, causes actuation of the counting mechanism.

While the present invention is useful in "Proving Meters" as described in the Pfrehm patent supra, it may be used in other devices where magnetic means may move past a location to actuate a switch.

A device in accordance with the presence invention as described herein was constructed consisting of a 4-ounce, 20-pound pull Alnico permanent magnet attached to one end of a fulcrum by means of a ⅜₁₆-inch diameter bronze rod. Above the fulcrum is a micro-switch located so that when a magnetic plug means or piston passes under the magnet, the normally open momentary contact switch closes, gating an electronic counter. After the position passes, the counterweight return the magnet to its original position, opening the contacts on the micro-switch.

The fulcrum and switch mechanism are encased in an aluminum explosion-proof housing consisting of a machined 5½-inch diameter, 1-inch thick threaded table or plate surface (for mounting the mechanism) attached to a 2-inch diameter, 3⅝-inch long bearing stock aluminum spool drilled for the 3/16-inch diameter rod to ride freely as the fulcrum moves. A ½-inch hole is tapped in the table surface to receive ½-inch conduit for electrical wiring.

A 5½-inch diameter bell cover screws onto the threaded table surface.

The spool portion of the housing fits into a No. 302 stainless steel coupon 4½ inches in diameter. The coupon is shaped to conform to the inside diameter of a calibration pipe replacing a coupon of like size cut out of the calibration pipe. The center of the coupon on the convex side is machined in a 2-inch diameter to a thickness of 3/16 inch at the center to provide a minimum distance between the magnet and the piston.

The nature and objects of the present invention having been completely described and illustrated and the best mode and embodiment set forth, what I wish to claim as new and useful and secure by Letters Patent is:

1. A detector switch which comprises:
    a counterbalanced pivoted arm;
    a magnet pivotally and dependingly carried adjacent one end of said pivoted arm;
    a micro-switch arranged in operative relationship to said pivoted arm;
    means operatively connecting said pivoted arm to said micro-switch for actuating said micro-switch; whereby passage of a magnetic metallic member in proximity to said magnet causes movement of said magnet from a first position to a second position and resultant relative movement of said arm to actuate said micro-switch;
    said arm being provided with adjustable stop means to limit relative movement of said arm caused by movement of said magnet;
    said magnet being separated from said metallic member by non-magnetic means.

2. A detector switch in accordance with claim 1 in which said magnet is carried by a rod means.

3. A detector switch in accordance with claim 1 in which said micro-switch is supportingly arranged above said arm.

4. A detector switch in accordance with claim 1 in which the means operatively connecting said arm and said micro-switch comprises spring means.

5. A detector switch which comprises:
    a pivoted arm counterbalanced by a longitudinally movable weight means;
    a magnet pivotally and dependingly carried adjacent one end of said pivoted arm;
    a micro-switch arranged in operative relationship to said pivoted arm; and
    means operatively connecting said pivoted arm to said micro-switch for actuating said micro-switch; whereby
    passage of a magnetic metallic member in proximity to said magnet causes movement of said magnet from a first position to a second position and resultant relative movement of said arm to actuate said micro-switch;
    said magnet being separated from said metallic member by non-magnetic means.

References Cited
UNITED STATES PATENTS

| | | | |
|---|---|---|---|
| 2,300,300 | 10/1942 | Lund | 200—84 |
| 2,711,454 | 6/1955 | Opuszenski | 200—84 |
| 2,911,509 | 11/1959 | Millerwise | 200—153 |

BERNARD A. GILHEANY, *Primary Examiner.*

J. BAKER, *Assistant Examiner.*